United States Patent
Ferrel et al.

(10) Patent No.: US 8,515,903 B2
(45) Date of Patent: Aug. 20, 2013

(54) COLLABORATION OF PLURAL DATABASES BY INTERACTION THROUGH UNIVERSAL INDEX

(75) Inventors: Mark Warne Ferrel, Adamstown, MD (US); Eric Kenneth Barnum, Germantown, MD (US)

(73) Assignee: Database Logic Inc., Yorklyn, DE (US)

( * ) Notice: Subject to any disclaimer, the term of this patent is extended or adjusted under 35 U.S.C. 154(b) by 0 days.

(21) Appl. No.: 13/432,737

(22) Filed: Mar. 28, 2012

(65) Prior Publication Data

US 2012/0185515 A1    Jul. 19, 2012

Related U.S. Application Data

(63) Continuation-in-part of application No. 12/201,622, filed on Aug. 29, 2008, now abandoned.

(60) Provisional application No. 60/977,223, filed on Oct. 3, 2007.

(51) Int. Cl.
*G06F 17/00* (2006.01)

(52) U.S. Cl.
USPC ............................ 707/609; 707/802; 707/821

(58) Field of Classification Search
USPC .......................................... 707/609, 802, 821
See application file for complete search history.

(56) References Cited

U.S. PATENT DOCUMENTS

| | | | |
|---|---|---|---|
| 6,145,121 A | 11/2000 | Levy et al. | |
| 6,256,676 B1 | 7/2001 | Taylor et al. | |
| 6,336,135 B1 | 1/2002 | Niblett et al. | |
| 6,738,975 B1 | 5/2004 | Yee et al. | |
| 7,191,450 B2 | 3/2007 | Gilfix et al. | |
| 7,979,475 B2 * | 7/2011 | Mack | 707/803 |
| 8,175,875 B1 * | 5/2012 | Dean et al. | 704/245 |
| 2005/0097149 A1 | 5/2005 | Vaitzblit | |
| 2005/0209880 A1 * | 9/2005 | Drelicharz et al. | 705/2 |
| 2006/0265481 A1 * | 11/2006 | Seitz et al. | 709/222 |
| 2009/0070401 A1 * | 3/2009 | Welch, Jr. | 709/201 |

* cited by examiner

*Primary Examiner* — John E Breene
*Assistant Examiner* — Andalib Lodhi
(74) *Attorney, Agent, or Firm* — Duane Morris LLP

(57) ABSTRACT

For integrating diverse databases, a server and universal index are provided to support a lexicon of variable definitions and formatting information. Subscribing databases establish equivalences between local variables and variables in the universal index, either directly or with translation such as a format conversion. For managing qualifying, preliminary processes can analyze database schema and stored variable values to assess likely matches between variables and universal definitions in the lexicon, presented tentatively to the local operator for approval or rejection. Matches can become approved for use in interaction with other subscribing databases. Processes enable the universal lexicon to be revised, e.g., expanded when a variable does not appear to match an existing definition. The universal index server can function as a data intermediary, or as a source of index definitions. Databases can indicate their compliance with the index during transmission of variable data referenced to index definitions.

6 Claims, 9 Drawing Sheets

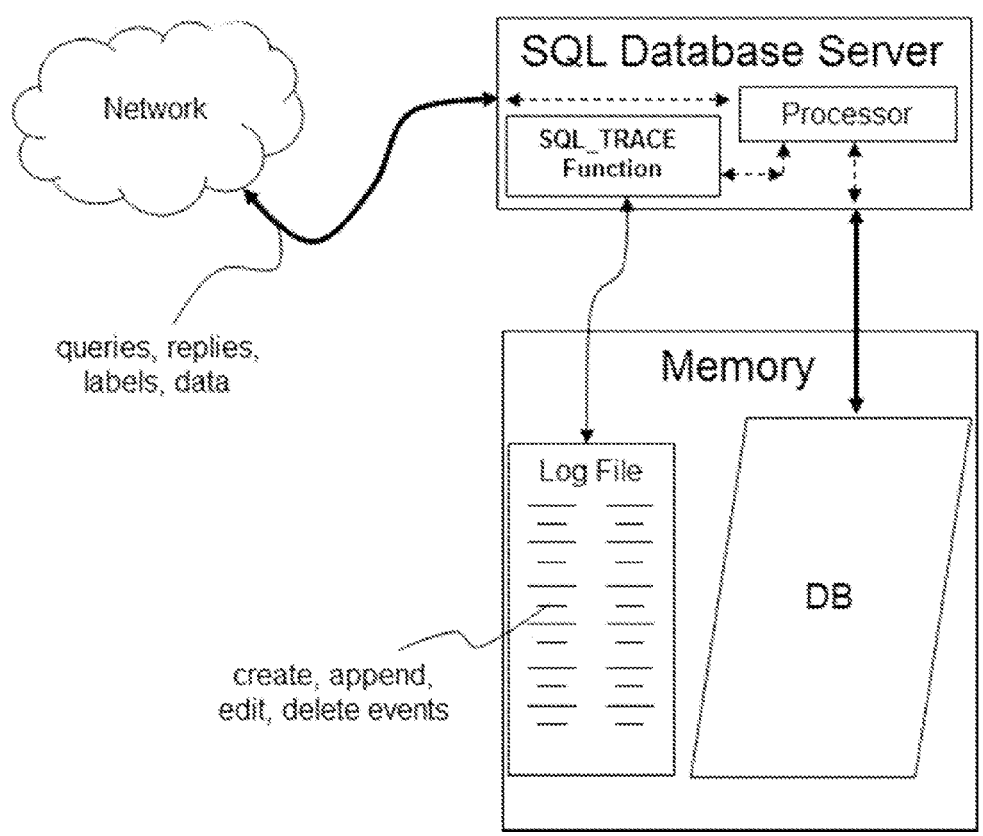

COLLABORATION OF PLURAL DATABASES BY INTERACTION THROUGH UNIVERSAL INDEX

CROSS REFERENCE TO RELATED APPLICATIONS

This is a continuation in part of application Ser. No. 12/201,622, filed Aug. 29, 2008 now abandoned, claiming the priority of provisional application Ser. No. 60/977,223, filed Oct. 3, 2007. Application Ser. Nos. 12/201,622 and 60/977,223 are incorporated herein by reference, in their entireties.

BACKGROUND

The invention relates to the cooperative operation of plural databases for extracting, updating, verifying and otherwise exploiting information that is useful to two or more member databases in a collaboration of plural databases.

Databases generally are characterized by tables of stored formatted data values in fields. Each field typically has a label. Each field relates in a planned way to other fields according to a database schema.

In some tables, at least one field value may be unique and functions as a key to which associated field values relate. For example, in a table keyed to individual persons, a unique serial number value such as the person's social security number may be a key for distinguishing a person from all other persons. A unique street address may distinguish a particular building. Other values are associated by one-to-one or one-to-many or many-to-one relationships that are useful with respect to the variables concerned. For example, a building may have plural residences. Plural persons may reside at a given residence, etc. Descriptive field values such as residents' ages or genders are associated with unique persons but the values may be common to many persons. Although these examples concern persons and residences, the same relationships are needed in databases containing various sorts of information such as financial and accounting information, production and sales data, etc.

The data values stored in a field are formatted as appropriate to the database designer's expectations for the nature of the information stored as field values and the uses to which the data is expected to be put. Formatting may include designating values as numeric or logical or as text strings. For numbers, formatting may designate values as positive or as sign and magnitude. Numbers may be integers or floating point (mantissa and exponent), and carried to a predetermined number of bits that determine maximum valid value or resolution. String variables can have a preset or variable byte length, etc. The choices made by database designers for field values and the relationships between and among the fields differ from one database to another because the database designers have different objects in mind. As a result, there are multiple standards and proprietary designs and definitions in database systems.

It is not uncommon for an established database to contain information that can also be found in another database. In the example of names of persons, their residence addresses and various descriptive values, the same persons may be found in commercial databases as customers, government databases as voters or taxpayers, employer databases, medical information databases and so on. When establishing a new database for some purpose, it would be useful if one could extract and use data that has already been collected and is contained in a preexisting database.

In a situation where two or more databases exist and contain some information that is common to both of them, it would be useful when an event occurs to change a value and the value is corrected and updated in one such database, if the correction could be propagated into other databases as well. However, databases that were established for different purposes are not likely to correspond closely. The database field relationship schema, and the formatting of the field values, and even the logical meaning ascribed to a field value, may be very different in different databases.

Considering, for example, a name, field, the fact that the field is a name field may be less important than the identifier of the name by type, as in "resident" or "taxpayer." In the example of a commercial business, the name could designate a customer, a sales prospect, a marketing prospect, a vendor, or even an employee. These types of names are useful for different purposes. While this straightforward example of complexity illustrates how databases need to be carefully organized, systems increase in complexity in integrated systems of multiple databases with overlapping but not entirely analogous data types and/or purposes. A "fixed unit price" field, for example, as established and used in one database may be known to include direct or indirect costs as well as have promotional discounts or sales tax already included. Such a field can be transformed to include these types of financial transactions, if not originally included, or not to include them. But to roll up into other application processes, this and similar rules need to be taken into account. The field label or title "fixed price unit" is not conclusive. At the level of integrated systems "rolling up" data in this manner, the original "fixed price" charged to a Type of Name can, by purpose, have very different meaning between systems.

Techniques are known including efforts to establish common standards for industry groups to use to facilitate communication between different database systems. A thriving industry of systems integrators exists, who are trained to interpret disparate systems and to create integrations by which data contained in one system is imported into another system, or wherein values of variable fields that ostensibly equate with one another may be compared and contrasted. Systems manufacturers work to build integrated suites of solutions that work together. In the suites, some field values are used by plural members programmed components of such suites. Still needed, however, are methods, systems and programmed products that are useful to create new and unique integrated systems solutions and in particular mitigate the increasing maintenance burden of making any kind of modification to either the integrated system by adding or removing a database from it, or doing the same with data elements within the overall integrated database system.

Complexity increases as a function of $n(n-1)$ where n can be an entire database, or a single data element.

If a database being added to an integrated system already containing five (5) databases for example, $5(5-1)=20$ database connections in the existing system. To increase this five (5) system to six (6, $6(6-1)=30$), a minimum of 10 ($30-20=10$) new connections need to be established to accommodate this sixth system, in other words. Another way of reflecting this is that to add a sixth system, 50% more connections need to be established correctly.

If a data field is added into an integrated system containing 1,000 data elements across 5 systems, the same $n(n-1)$ logic applies. There are $5(5-1)=20$ connections between databases representing $1,001(1001-1)-(1,000(1,000-1))=2,000$ maximum possible impacts.

One example of a technique to establish common standards to facilitate communication between database systems is Extended Markup Language or XML. Generally, if a set of conventions is established for naming particular data values with labels that are unique or substantially to a recognized comprehensive definition, then programs that might use the data can be made to recognize the nature of data values or segments in a data collection, by their associated labels. Theoretically, the programs can overcome variations that are encountered (such as the order in values that appear in succession) by relying on XML labels, and deal with the data appropriately. In an example, when an online procurement system is designed to deal with data exchanged with a number of vendor systems, it is useful if the different vendor systems attach the same variable labels (namely the XML labels) to data values that equate with one another and can be imported into the same variable fields in the procurement system.

Difficulties may arise if the variable fields in the systems to be integrated are different with respect to the nature and/or formatting of the data values that are contained. The nature and formatting of data is often different, sometimes in subtle ways, in systems that were not designed and maintained to interact with one another. Each proprietary data feed for integration may need to have custom code built to conform its data to the parameters of an application. Human attention is needed to investigate the extent to which the variables actually do equate, and perhaps to predict situations in which the variables supplied from proprietary sources may not comply with the needs of the application, causing a failure of some kind. The level of maintenance and effort for an integration approach like this is substantial. Beyond mapping our workflows and identifying shared data processes, a data dictionary is often created with a new set of standards to accommodate the differences across middleware, or real time management systems. Beyond a substantial effort to manually create and maintain, at the point that more than two (2) data systems connect, relatively small changes in any one connected system can have unpredictable consequences to the integrated system (as in a meta fixed price field suddenly having a field for the fixed price, then a new field for sales tax, and a new field for fixed price+sales tax equaling the former fixed price) or even break the integration all together if alterations fall outside allowed limits for naming, type of data, or amount of bit data stored. It is not just the complexity of an integrated system that increases, but also the maintenance and consequential impact of any single change anywhere in that system.

XML was thought at one time to provide a possible solution and opportunity for business industries to solve brute force database integration problems. XML labels if used consistently according to an industry standard could possibly be uniformly adopted within an industrial sphere. If all systems used matching field labels for field values with definitions that were complete and accepted, then database integration could be automated. It appears, however, that attempts to standardize database standards have had limited success. Competing commercial entities in industry groups tend to pursue a standard that suits their specific needs or preferences. What is still needed is a straightforward integration process instead of multiple competing standards in each industry or in distinct groups within industries. Moreover, most commercial entities have taken to defining their own standards for their own enterprise defying the creation of any valid "industry" standard except for those systems obligated by law to report to state and federal entities in defined formats, often with allowances for manual paper-based submissions.

SUMMARY

It is an aspect of the present disclosure to establish an equivalents engine that maintains data field definitions and also supports the addition and evolution of data field definitions, in a transparent and accessible way, and thereby provides a way to equate data fields, either on a trial or permanent basis, over the entire scope of possible data fields that may be used now or in the future.

BRIEF DESCRIPTION OF THE DRAWINGS

There are shown in the drawings exemplary but nonlimiting embodiments of the invention as presently preferred. Reference should be made to the appended claims as defining the scope of the invention in which exclusive rights are claimed.

FIG. 10 is a block diagram showing an SQL Database Server comprising a processor and a memory, coupled to a communication network.

DETAILED DESCRIPTION

Figure 1:
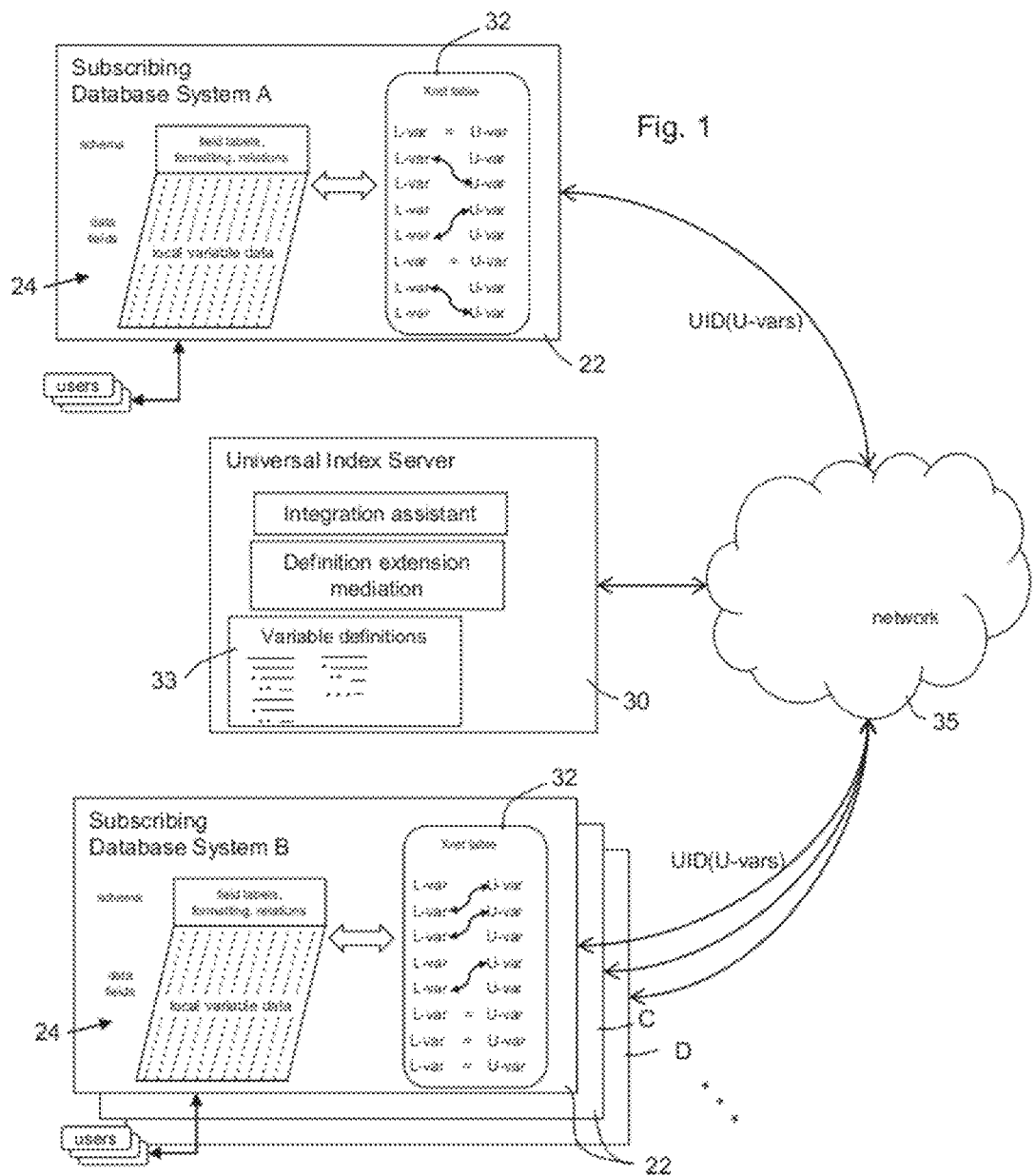
FIG. 1 is a block diagram showing the use of a Universal Index in an integration of System A and System B. It is understood that each of these Systems A and B is one of numerous users of the Universal Index enabling fields in a system such as one of System A or System B to be equated with some degree of confidence to Universal variables in the Universal Index. By extension, two or more Systems with variables equated with a variable in the Universal Index have identified variables that are equated to each other.

A central index is established to serve as a single integration point for any system to be integrated, as in Field X of System Y equates to Field 1 of System 2 within flexible parameters that can be user-controlled for absolute matching or fuzzy matching logic. The transfer and possibly also standardization of formatting and similar data massage steps, are caused to occur in the central index system or are accomplished using information made available from the central index. The central index captures Field X equivalency to Field 1 as a unique identifier held and stored in the index for future use and reference.

Because System Y and System 2 are known and identifiable, Field X to Field 1 equivalency can be readily identified and captured, both as the absolutely-limited values of their respective originated systems as well as whether their equivalency is absolute or fuzzy in nature. Any new inclusion of an additional system against System Y or 2 can therefore track and present X<->1 equivalency for consideration in the new system. Continuing the fixed price value example, should the new system contain a fixed price value, the operator knowing the new system parameters would be able to use the index to search and screen possible equivalencies, finding X<->1 equivalency, X<->1's equivalency originated absolutes by system and the nature of the current equivalency. The index provides a simple tool to apply X<->1 equivalency to the new field as applicable so that X<->1 is now X<->1<->NEWFIELD. The index maintains the "overhead" of all applicable equivalencies so that local manifestation is simply X<->NEWFIELD rather than the entire equivalency track.

Capturing an indication of absolute or fuzzy equivalence can range over a spectrum wherein format-identical same-definition analogous-use fields have been proven to match one another after a long proving period and are dependably equated, through more tentative levels of likely but unproven equivalence, tentative equivalence and so forth. The present techniques are useful if equivalence is established at some level. The level of dependability can be represented in the equivalents engine together with the notation of equivalence according to a dependability standard (absolute or fuzzy or the like).

Accordingly, an index of certain variable definitions is established for universal application. Insofar as a participating database may maintain a variable or set of related variables that correspond to a universal definition, that variable or set can be associated by the operator of the participating database with the universally defined variable or set. The "index" takes the form of a searchable menu of items queryable for Field X or Field 1 or by all fields matched in System Y or System 2, and so on. Because equivalency is already established between certain fields and systems, each new inclusion, once matched into the "index" is by extension matched to all pre-existing and completed matches. This allows essentially any equivalent match to be immediately transversely propagated across any integrated system via the "index". In other words, X<->1<->NEWFIELD in the pre-existing index is always available for tracking purposes each time a new equivalency is added. X<->1<->NEW-FIELDs . . . is the universal definition held against the system and version of origination's absolute specification for the field and the absolute or fuzzy equivalency held by the index.

When a change is made to a variable value associated with a universal definition, in any one participating database that has associated its local variable with the universal definition, that change is published or otherwise made available to the other participating databases through the universally indexed variable identification.

A correction or update of a variable value therefore may be made in one participating database, and the change can be exploited by other collaborating databases through the universal index, e.g., by adopting the same update locally or at least taking note of the change. Each collaborating database maintains at least some variable fields or sets of fields that contain information also found in others of the databases and are associated with definitions in the universal index. However in other respects, each database can be configured differently and operated for its own purposes, can have a diverse sets of variables and variable relationships, and need not be otherwise integrated or reconfigured to match the configuration of any other participating database as a cost associated with the benefit of obtaining updated information.

As illustrated in FIG. 1, a subscribing database System A and at least one additional subscribing database System B are to be integrated, i.e., determined to have variable fields that are related either directly or with identified processing steps, and optionally with a rated degree of confidence. This is accomplished not by working to integrate one or more variables in System A with one or more variables in System B, but instead to integrate both systems to a Universal Index Server. The result is to integrate System A and System B to the extent that variables in the two systems have been found to equate to the same variables defined in the universal index server. An advantageous additional result is that these Systems A and B are consequently integrated with variables in other database systems C, D, etc., that have also subscribed to the Universal Index Server system and its "E2" Equivalence Engine technique. Furthermore, if changes should occur in the database systems, the established equivalence enables changes to be propagated through the subscribing databases in reliance on their established field equivalences.

In this disclosure, a "database system" or "database server," such as subscribing database systems A, B, C and D in FIG. 1, shall each be construed as comprising a computer system with a processor and a memory. An example is illustrated by the SQL database server shown in FIG. 10.

In some cases, the equivalence of fields with universally defined fields is not concluded initially with a high degree of certainty. In that event, tentative equivalences, fuzzy equivalences for example containing caveats, and equivalences that entail some sort of data conversion are established as well as absolute equivalences where possible. These relationships are published and automated or human processes can take such account of the relationships as is appropriate for a given use. Among other possibilities, tentative, fuzzy or other equivalences may be useful in processes that concern probabilities as opposed to absolute certainty. The tentative, fuzzy or other equivalences can contribute to further processing to advance to a state of better understanding or a higher degree of confidence, for example by operating a tentative equivalence for a long enough time or with a wide enough range of varying circumstances as to expect that the presence of errors would have become apparent if the equivalence contained faults.

In one embodiment, changes in universally defined variable values occurring upon execution of any Insert, Update or Delete (IUD) activities may be reported by the database via the index automatically to other subscribing databases, together with an indication of the identity of the universally defined variable.

Each collaborating database maintains at least some variable fields or sets of fields that contain information also found in others of the databases. Each database can be configured differently and operated for its own purposes, having a diverse set of variables and relationships. For integrating the databases, a universal index is defined and maintained, containing comprehensive definitions of the meanings ascribed to data in the fields including such common fields.

The introduction of a new system into the Universal Index (hereinafter at times termed "E2" or the "E2 System) begins with the local operator describing their system for presentation. Identifying Criteria include (but are not limited to) Industry, Database Type and Version, Who the Operator is (for the human but also their business entity), and the Purpose of the presented application's data layers. Ideally, the Identifying Criteria culls together enough information to enable an operator to screen the E2 Index for likely system matches before attempting to establish even a single data element (DE) level equivalency. If even a single data element equivalency can be matched from the new presented system to the E2 Universal Index, that data element can act as a lever to refine the Identifying Criteria system matches via equivalency tracking to better identify likely analogous-in-purpose systems across all industries.

By using even a single equivalency track, we therefore speed the matching process by either knowing with confidence that the new system is in fact entirely new, or relying on the E2 Index to present and allow matches to be made at much higher confidences or even automatically.

An Identifying Criteria enabled equivalence track establishing more than a certain minimum threshold of confidence (determined by the operator) allows automatic assimilation of the new system. For example, a single match allows the E2 Index to present or propose analogous systems for match consideration. More than a 10% match between systems (or a similar predetermined threshold matching value) might suggest that the tentatively matched systems are in fact the same or truly analogous systems, or at least shall be regarded as analogous during continued efforts to integrate. Following E2 Index matching, the output produced is a list of non-matched fields for operator resolution as follows: 1) fuzzy match, 2) transform and exactly match, 3) insert new, or 4) ignore.

The universal index is embodied as an Equivalents Engine (hence the name E2) whereby integration of a database system with the centralized universal index thereafter eliminates a need for additional integration work in order to integrate with a foreign system. Instead, the foreign system is integrated with the central index, adopting each equivalency thereby. The central index and its Equivalents Engine (X<-> 1<->NEWFIELDs . . . ) bridges between transfers between any two or more systems that conform to the centralized index via a transitive function based on System, version, and other identifiers.

As an example, if the centralized index includes a fulfillment organizations such as Amazon.com and a product catalog is to be integrated as a new system, Amazon.com's equivalency will be a product type and description identifier as the primary equivalence.

A new foreign product catalogue presents to Amazon.com and an operator searches for the product descriptor, and sets equivalency between their local system and Amazon.com as in Amazon<->NEWPRODUCTCATALOG.

Presuming that Amazon.com is also integrated with a variety of financial packages, like Quicken, Turbo, Great Plains, etc., the operator may choose to establish equivalency through the product catalog to the Amazon.com fixed price field and on to their local accounting software package. Equivalencies are therefore established as: Amazon<->NEWPRODUCTCATALOG and FINANCE<-> Amazon<->NEWPRODUCTCATALOG<-> FINANCE. These are associations wherein the databases recognize their equivalences.

As one beneficial result, diverse databases can be integrated in an ongoing manner, for example such that changes in data field values in a subscribing database system can be propagated to other database systems. In one embodiment, a data integration method employs a command and control application associated with the universal index, interacting with a monitor module to observe Insert, Update and Delete (IUD) activities of a subscribing integrated databases for the purpose of grabbing data (e.g., for publishing added, updated or deleted data values to other subscribing systems) when there is a subscription match of an equivalently defined data item.

The root level procedures that a database manufacturer uses to run a database are manipulated to track all IUD actions. The manipulation consists of a SQL "wrapper" configured around the SQL trace functions, or similar trace set (an internal monitor of IUD functions found in all databases as an intrinsic tool set) that then reports these to either a localized or centralized E2 index. The index follows the IUD events and propagates equivalency throughout the system as specified by the operator.

When a match is found in a subscribed integrated field in the universal index, any and all databases which subscribe to that field will be updated in order to maintain a desired integrated dataset in multiple different systems which retain their original uniqueness in design, but now hold updated integrated data. Continuing the example of a FIXED PRICE, when a subscribing system is updated to include a new catalogue of inventory for sale at fixed price, the new items are automatically propagated throughout the integrated system based on the established equivalencies for "INSERT NEW [item, price]" and become subject to meta data rules that might apply a state sales tax filter, for example, or determine if the equivalency already includes a fixed price. Furthermore, equivalencies might exist around this example for whether the INSERT NEW event occurs in an Inventory, Financial, or other system so that equivalency could (as an example) apply to financial rules for a particular financial system.

Indexing definitions are presented for matching through an interface that parses system and/or field-value data to suggest relevant definitions for human confirmation through the module GUI interface. To present and create an easy-to-follow equivalency trail so that any change system-wise can be easily and transversely propagated, or to allow IUD events at the data level to similarly propagate. In this way, it is easy to add to an already-existing "index" system. By the same token, it is easy to see how any changes at the data-level track equivalency into other subscribed systems for configuration and assessment of one system's change impacting the others. This directly results in a much lower maintenance and management threshold by maintaining equivalency "tracks" at the system and field-value level so that system version, ongoing development, and the introduction of new capabilities are continually assessable against the entire integrated system via the index, immediately and without impacting the system's integrity.

Referring again to FIG. 1, a universally defined index of data fields to be integrated is generated as a central point for integration. Instead of comparing and mediating a common schema that will be imposed on two or more database systems that are linked to operate cooperatively, the universal index is a bridge by which the operators of such two or more database systems, by independent action, establish and/or choose among data fields having defined variable semantic meanings and formatting aspects. Instead of standardizing a set of plural databases to form a single unified dataset for a common purpose, the universal index provides an authoritative index that is configured to store definitions containing pertinent aspects of data fields for general and specific application. The definitions are made available to subscribing databases and can be adopted by subscribing databases where possible. Subscribing databases are enabled to represent that data fields of the subscribing database correspond to the established definitions in the universal index. This can be a matter of cooperation in that database operators may agree to conform to the definitions and formatting specifications defined in the universal index when using a unique variable name approved by the universal index. When conforming data transmissions, reports and the like in this way, other database operators can rely on the universally indexed details of meaning, formatting and the like that are associated with the applicable definitions in the universal index.

Figure 2:
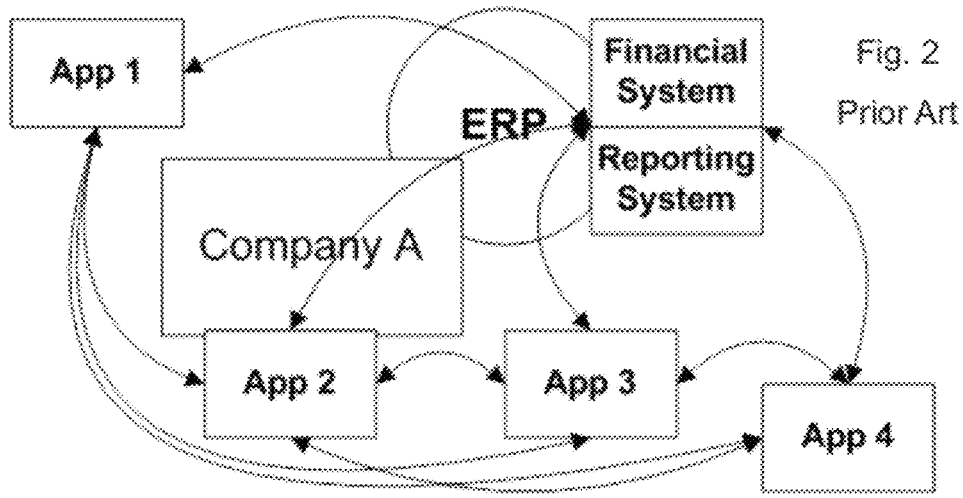
FIG. 2, labeled as prior art, is a block diagram that shows connections over which cross comparisons are needed to establish the equivalence of variables in the databases of several applications (apps) of an enterprise.
Figure 3:
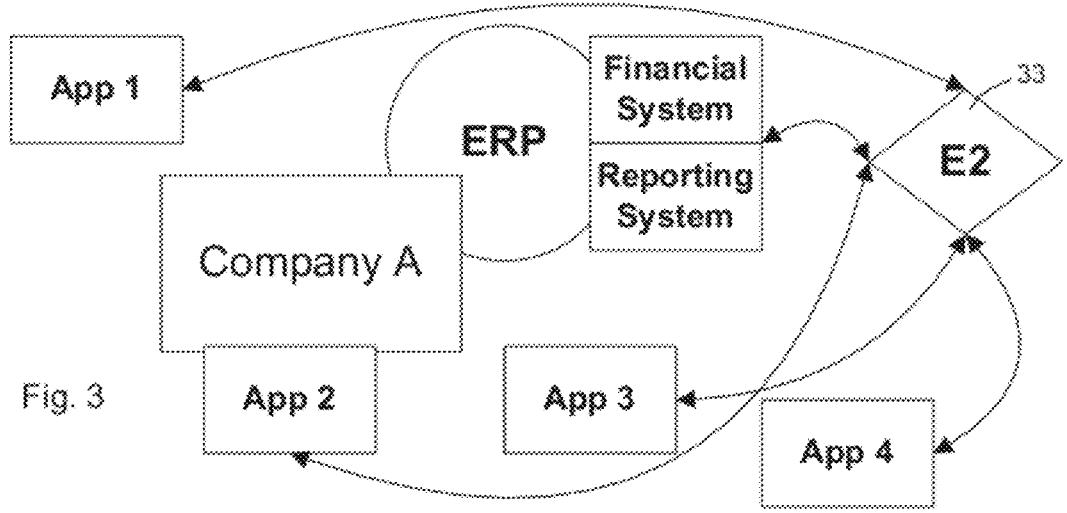
FIG. 3 is a block diagram showing several applications of an enterprise, but wherein establishing equivalences through the E2 Equivalence Engine substantially reduces the complexity needed to integrate the application databases, or after integration reduces the complexity of rippling changes through them.

FIGS. 2 and 3 demonstrate a comparison of the number of data flows that are affected by database integration between plural applications (app1 to app4) in a typical business model, namely where an enterprise resource planning process (ERP) is hooked to a financial and reporting mechanism in support of Company A's business processes. Applications 1, 2, 3 and 4 are business critical applications running independently of the ERP, but all these applications and systems share date values under variable definitions that are maintained for all the element that are connected. This diagram is a microcosm the larger data processing universe of which Company A is a member and which might benefit from sharing data values.

In the examples shown in FIGS. 2 and 3, App 1 could be an Order Taking System; App 2 is a Shipping and Fulfillment Tracking System; App 3 might be a Departmental Budget Control and Procurement System; and App 4 could be an Inventory Management System. These are applications that are interactive, although each has different uses for the variable values that are shared. Next, assume that Company A decides make a change, such as to install a new Financial and Reporting System add-on for their ERP. It would be possibly impractical for the Company to re-process and import data from their previous financial system. Company A might find it easier to buy a new such a system already compatible with the ERP than risk losing data in an integration effort.

Apps 1-4 need to be integrated with the ERP or there is a risk of losing key data, creating a business requirement for double-entry of data at multiple critical points. Having just spent considerable time and effort to install and get the ERP working, Company A decides to integrate only a selected application, say App 3, until it is proven to work with the new ERP Financial Reporting System. The typical process is to integrate by customizing App 3 so that all of its data fields match all of the ERP data fields. Then ties are set to synchronize the two systems as an append function whenever a change is made. For a company with six departments spread over 300 employees and an IT group of 15, this might take Company A three months to accomplish, test, and set into operation.

To continue integrations, Apps 1, 2 and 4 need to be integrated with the ERP and App 3. Integrating the entire system together actually takes eight integration efforts. The integration needs to work seamlessly in both directions. For purposes of this example, each direction will be counted as a data flow.

According to this integration process, which is the current standard approach for systems integration, the number of connections can be written in a formula as $n(n-1)=f$; where n=the number of applications being integrated and f=the number of data flows that need to be created and managed to successfully support the integration. See Table I for an illustration of the exponential increase in data flows to be integrated and proven as a function of the number of integrated applications.

TABLE I

| Number of Applications in an Integrated System | Number of Integrated Data Flows to Maintain | Flow cost for +1 App |
| --- | --- | --- |
| 2 | 2 | 4 |
| 3 | 6 | 6 |
| 4 | 12 | 8 |
| 5 | 20 | 10 |
| 6 | 30 | 12 |
| 7 | 42 | 14 |
| 8 | 56 | 16 |
| 12 | 132 | 24 |
| 20 | 380 | 40 |
| 50 | 2450 | 100 |

According to the present disclosure, the Universal Index provides a bidirectional integration effect, but each database or application in integrated only once with the central Universal Index instead of repetitively for each data flow. The integration of the apps with the central index allows the automation of data flows between apps. FIG. 3 shows that the apps are matched to the Universal Index E2, and the matching between apps is an inherent result of data field matching and dataflow control using the E2 equivalence engine.

According to the resulting integration and maintenance model through the E2 approach, the number of connections can be written by a formula a $2n=f$; where n=the number of applications being integrated and f=the number of data flows that need to be created and managed to successfully support the integration. Table II shows the increase in number of data flows by number of applications, which is plainly and improvement over the increasing complexity with number of integrated apps as shown in previous Table I.

TABLE II

| Number of Applications in an Integrated System | Number of Integrated Data Flows to Maintain | Flow cost for +1 App |
| --- | --- | --- |
| 2 | 4 | 2 |
| 3 | 6 | 2 |
| 4 | 8 | 2 |
| 5 | 10 | 2 |
| 6 | 12 | 2 |
| 7 | 14 | 2 |
| 8 | 16 | 2 |
| 12 | 24 | 2 |
| 20 | 40 | 2 |
| 50 | 100 | 2 |

The universal index contains singular definitions for all possible data fields as well as names or labels that are unique within the universal index, and are available for matching via conversion routines or tables with fields in any database. Granular in nature, this index allows for a module to convert data type and length to conform to subscriber and subscribee allowing for cross system data transfer in an automated fashion. In one embodiment, granular field definitions are created in a centralized equivalents index;

fields with like and/or similar names and/or values are initially identified, preferably as an automated system for integration process;

fields without like and/or similar names and/or without values that can be compared or related readily are presented through a management console for manual matching by an administrator;

all fields are presented for integration confirmation against the centralized index definitions;

data type rules for automated conversion are implemented consisting of determining the lowest common denominator that a field can be converted to while still retaining a useful set of the original fields data; and security rules are implemented determining the authorization levels needed for another integrated system to request integration through the central index.

In some embodiments, an integration module allows fields to be matched up between the integration systems and the central index. Instead of needing to integrate two systems together, a system is integrated one time against the central index. This then allows a central command module or function to automate any other integrated share of data with any other system which likewise has been matched to the central index. The integration module of the E2 system analyzes the fields making up a database to be integrated, for intelligence or information that suggests a relationship if not direct equivalence. The integration module presents a report to an administrator or analyst showing logical pairings (or other relationships) that can be approved and accepted or further investigated. Rejected matches are associated with the unmatched fields. The rejected and unmatched fields may be subject to manual integration, revision, introduction of a translation process or the like if appropriate, or alternatively, the unmatched fields can remain un-integrated with the E2 equivalence engine and useful only to their home app.

E2 Analysis occurs as a function of equivalency tracking, as in the examples above where the index already contains a FINANCIAL SYSTEM <->Amazon.com eCOMMERCE<-> NEWPRODUCT CATALOG. In this example, an operator need only be concerned with matching their product catalog up with Amazon.com.

Assuming they have a pre-existing-in-the-index FINANCIAL SYSTEM of their own, the Amazon.com equivalency would feed price, cost, tax, shipping, and other financial system data directly through E2 equivalencies, with most integration being a matter of following equivalency tracks and confirming new system integration with pre-existing system integration.

Assuming that a new system does not already exist in the E2 index, the operator identifies certain parameters of the new system (e.g., COTS vs. custom built, version, function descriptors, etc.). By comparing identifications of subscribing systems, similar systems can be relied on to facilitate equivalence identification at the field level. The operator who is establishing equivalences for the new system can refer to previously-established systems, and once the new system equivalences are established, later operators can take advantage of some or all of the equivalences that were previously proven or established.

Alternatively, for example if no sufficiently similar system is found that is useful as a starting template, the operator of a given new system invokes a function CREATE A NEW SYSTEM in the index. The E2 equivalence engine can use a crawler to automatically map the data fields of a given system, which fields are then ported into the E2 index. The operator, with each new field created, identifies fields that are similar to the system identification. As fields are identified, E2 presents the operator with an ever-larger set of similar, analogous, or transitively-equivalent fields. Transitively equivalent fields are not equivalent as they exist but can be made equivalent by defined alterations, such as reformatting the month-day-year order of dates.

Once any matches are made, equivalency tracking between fields in the local system and in E2 definitions (or other systems that have been established in E2) provide a streamlined approach by identifying fields of interest for potential equivalence with fields that are related in the local qualifying system and/or in the index definitions. Or if equivalency tracking produces dead ends (no associated connections of fields and definitions), then there is increased confidence that proposed newly established fields to be set up in E2 are truly new, reducing redundancy. New systems and new fields in E2 remain available for the local operator's use, but do not become generally available until proven or certified. For example, new systems and/or new fields can be opened to general use after a peer-review process or after an established agent confirms that the new system/data elements are matched in the E2 index to a predetermined level of confidence. One technique for proving successful matching is to run the local system in communication with another system through E2 for a time while monitoring for error conditions. Another technique is to apply standardized testing such as by processing input data with known characteristics, potentially including idiosyncratic data values, and compare the results to expectations for accuracy of output.

In certain embodiments, the E2 system applies one or more matching algorithms to the system seeking equivalence qualification, in an effort to identify fields based on defining attributes that are frequently encountered or preferably universally employed, at least in systems of the same category. These attributes include but not limited to characteristics such as variable name, available definition, system of origination, variable size and type. The E2 system takes matches that the process identifies as possible matches that can be tried or subjected to additional testing and approval steps.

Normally it is advantageous for the list of identified possible matches to be recommended or presented to a human operator having knowledge of the systems. The human operator often can accept or reject some or all of the possible matches. Fields that do not make a match are kept aside for the human operator to manually match up to the universal index if possible. If no match is made, then a submission request is created to add the new field to the universal index. A review team manages the purity of the universal index and reviews new field definition requests and determines if a new index item needs to be created or if the field should match up with a previously defined index item. Alternatively, if the field matching involves pre-matched systems and data fields already in the "index", these are presented to the operator who confirms equivalency. Once equivalency is established, the integration is complete to the level of equivalency tracking the operator wishes to establish in their own particular deployment.

Some discussion is appropriate respecting the how index items, variable types and values that fit into the variable fields relate to one another. Some index items may have any number of values and various uses in their respective applications. Some values have few alternatives and are highly-specific and/or detailed. For example, items like gender (male/female)

are a value of an index item, not an index item itself. In this case, Gender, as a TYPE OF IDENTIFIER, can be an index item defined in the universal index. Depending on industry, value items kept in a field would vary (e.g., Ms., Miss, Mrs. or simply "f"). Thus E2 would usefully integrate two healthcare vendors systems with female patients and doctors. E2 would not be as helpful in integrating a genetic modeling database with a financial reporting system as the values in any similar fields would hold nominal cross over value.

In the event that an operator determines there is no equivalence, the option to INSERT NEW (to create a new universal index field) is presented to establish an equivalence with a field in the E2 index. In this way, useful data fields become available for matching with other systems that subscribe and qualify, and the result is both to standardize the data in databases and to make additional information available that will provide advantages or satisfy needs. Because equivalences create trails for flow of data from one system to another, this data flow can be followed not only to test newly-created universal index fields, but to test and confirm their equivalence, and to make data available for wider exploitation as part of the overall system available to all users. There is thus an improved availability of useful information, as compared to having database equivalence work of operators and/or comparative process reserved for the integration of particular systems of databases within an enterprise or between limited enterprises, with no value to the state of information processing at large.

Referring to FIG. 1, a system to facilitate information sharing between databases, comprises a plurality of independently functioning database systems 22 (Systems A, B, etc.), each of the database systems maintaining data fields 24 that store values of variables having locally predetermined meanings, formatting attributes and relationships according to a database schema that is specific the respective said database system, and wherein the meanings and formatting attributes of the variable and the data fields, and labels applied thereto, differ arbitrarily among the plurality of database systems 22. At least certain variables and data fields in at least two of the database systems 22 maintain values of variables that have substantially equal conceptual meanings. A universal index server 30 is coupled to the at least two database systems 22 over a communication network 35. The universal index server 30 is configured to maintain a lexicon 33 of entries for diverse variables, having definitions that contain meanings and formatting attributes of the variables, documented by information stored in the universal index server and made universally available to at least a subset of the plurality of independently functioning database systems 22.

At least one of the universal index server 30 and at least two such database systems 22 support a comparison process for comparing the locally predetermined meanings and formatting attributes of the variables of the at least two database systems 22, against the meanings and formatting attributes in the lexicon 33 or otherwise stored in the universal server 30. The programmed comparison process produces for each of the database systems 22 a cross-reference table 32 or a similar record of connections wherein at least certain of the variables of the at least two database systems 22 are referenced separately for each of the at least two database systems 22, against entries in the lexicon 33 maintained in the universal index server 30. The variables in the database systems 22 can be determined separately to be equivalent to definitions found in the index server 30, or the variables can be determined to be equivalent provided that a translational process is applied to the variables to make the variables equivalent to the definitions.

The cross-reference table 32 (or a similar logical or programmed connection such as a data addressing scheme) associates variables with locally predetermined meanings against corresponding definitions in the lexicon. The cross-reference table contains translation parameters for converting between the locally determined formatting attributes and the formatting attributes for corresponding variables in the lexicon where necessary.

The two or more database systems 22 are configured for at least one of transmitting and receiving information between one another or over the communication network 35, using variable values that are referenced to the entries in the lexicon 33 of the universal index server 30, which operates as an equivalence engine (E2) with respect variable values having meanings that are made reliable by their reference to the universal index and are generally made widely useful because the meanings of the variables is made known to subscribing databases 22 and others.

Figure 4:
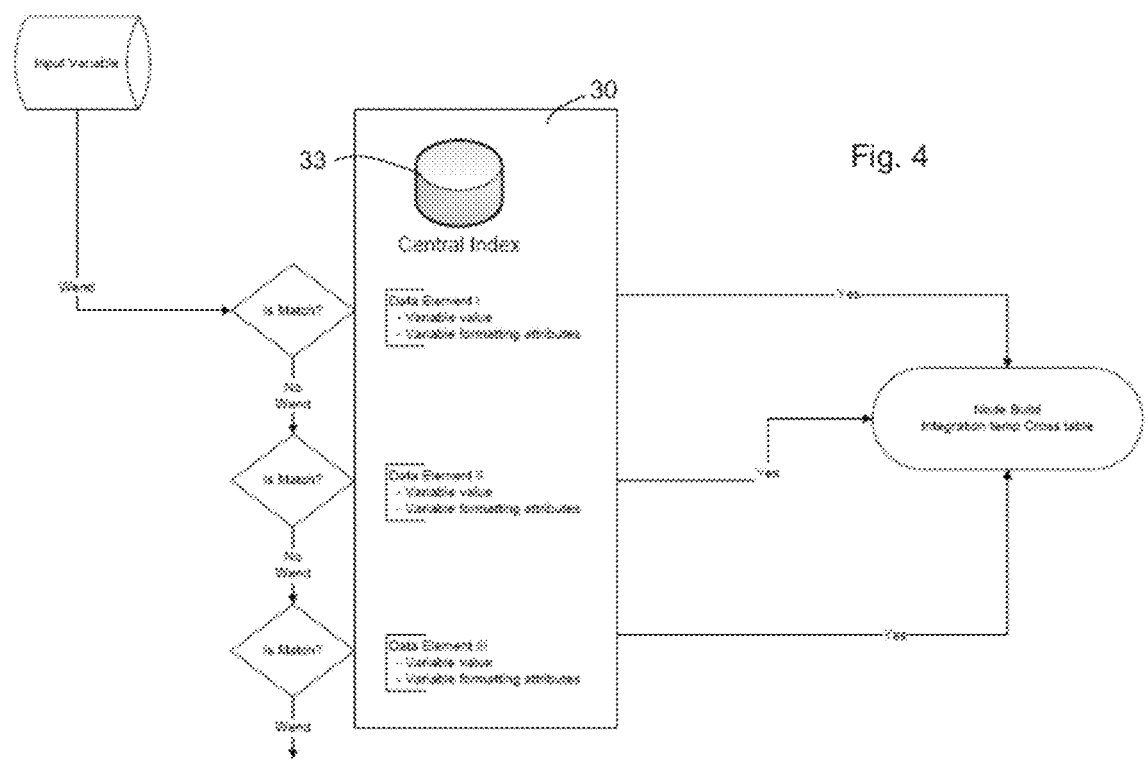
FIG. 4 is a flow chart illustrating a programmed comparison process to compare variable values and their formatting attributes against universal index standards for producing a tentative version of a cross-reference table, namely a table identifying matches.
Figure 5:
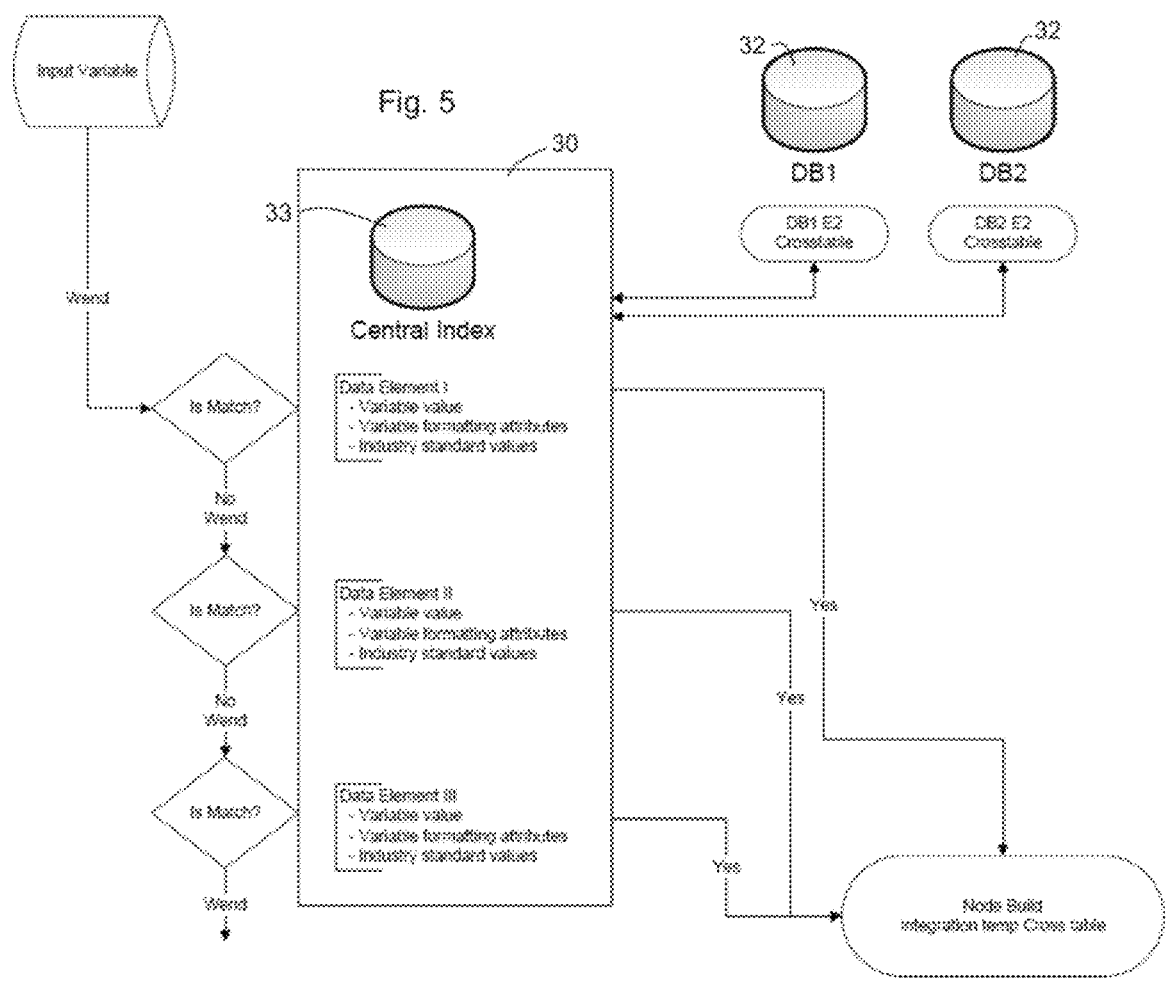
FIG. 5 is a flow chart illustrating comparing variable values and formatting attributes for data fields in two or more data bases versus commonly encountered data fields, each database having a cross reference table that provides an interface specific to the database respective database, the interface optionally including processing steps in addition to the indication of a match.

FIG. 4 is a flowchart showing a programmed comparison process configured to compare at least one of variable values and variable formatting attributes for effecting cross referencing of a database 22 and the universal index. The cross referencing results can reside in a cross reference table 32. Initial comparison of characteristics such as variable labels, locally stored definition text if any, formatting details, and other values can be analyzed, and alternatively or additionally, values stored in the variables can be compared to expectations represented by the definitions 33 in the universal index. FIGS. 1 and 5 show the production of at least a tentative version of a cross-reference table 32 for databases 22 that have subscribed or are in the process of doing so. In FIG. 5, the programmed comparison process is configured to compare at least one of variable values and variable formatting attributes for data fields in the at least two databases against standards for commonly encountered variables, for producing a version of the cross-reference table. The table can be limited to particular ones of the data fields, leaving other data fields unmatched to the universal index server 30. However preferably, the universal index 30 contains definitions for a substantial proportion of the variables that are usefully exchanged among databases 22. For this purpose, provisions are made to establish new variable definitions when the need arises as shown by attempts to qualify a subscribing database 22 wherein equivalent definitions have not been found.

Figure 6:
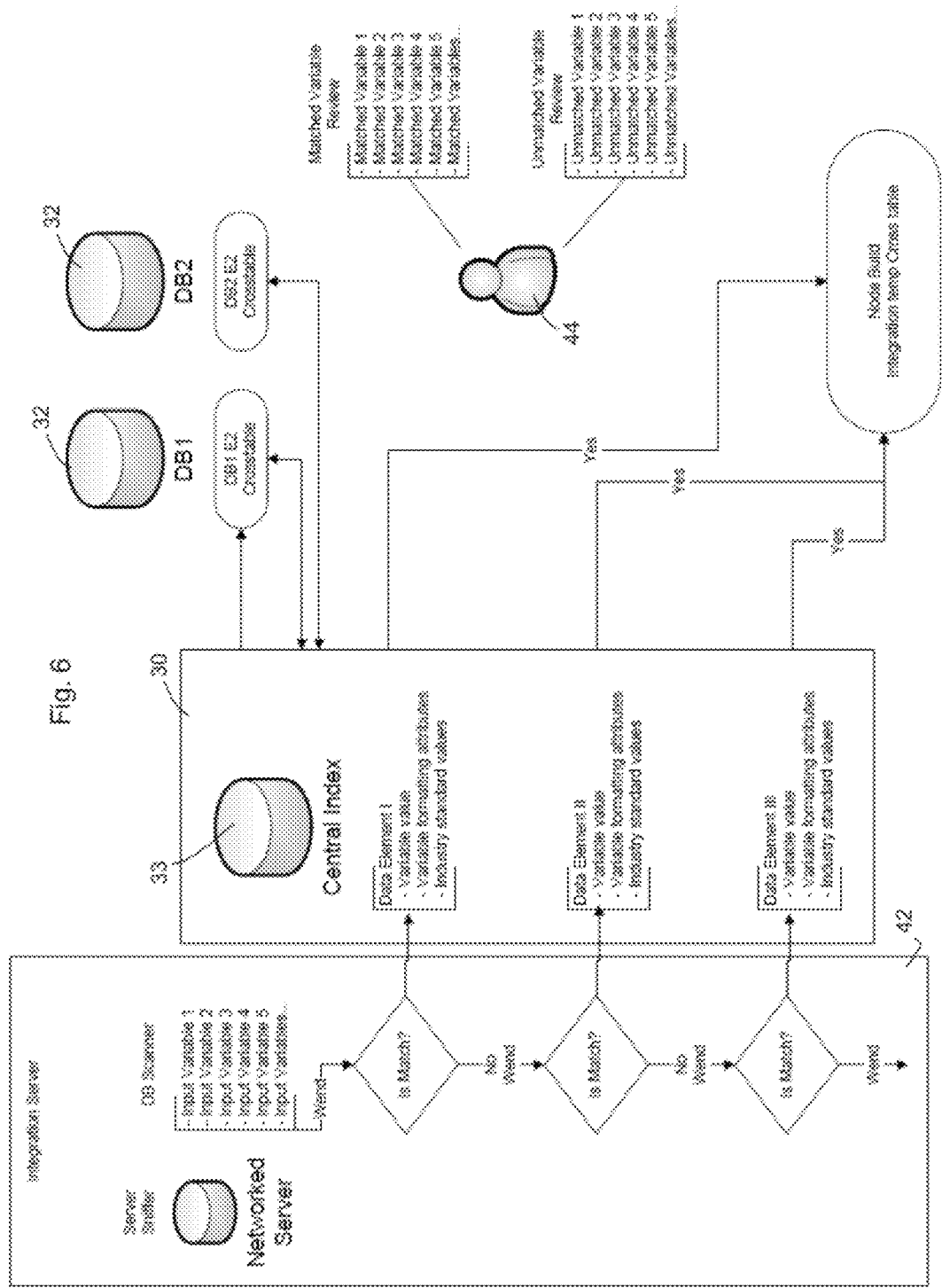
FIG. 6 is a flow chart showing review of matched and unmatched variables by a process or by a human operator for resolving or prompting the addition of matches to the cross reference. This review of matching and unmatched variables can include recording a level of confidence in one or more matches (e.g., absolute or tentative) and/or recording processing steps that may permit fields to be equated with universal fields if the field contents are first processed (e.g., for format conversions, arithmetic adjustments that optionally can factor in other variable values, or other process steps, etc.).

FIG. 6 shows an integration server 42 coupled to the network 35 (not shown in FIG. 6) and to an operator interface 44. The integration server 42 is configured in conjunction with the database cross reference tables 32 and the central index server 30 to present to a human operator a comparison of the definitions and formatting attributes of variables found in the lexicon 33 against one or more (or all) of the definitions, variable values, formatting attributes, variable labels and schema for variables found in the at least two databases, for prompted additions of data fields to the cross-reference table 32 or for proving or confirming the validity of entries in the cross-reference table.

Figure 7:
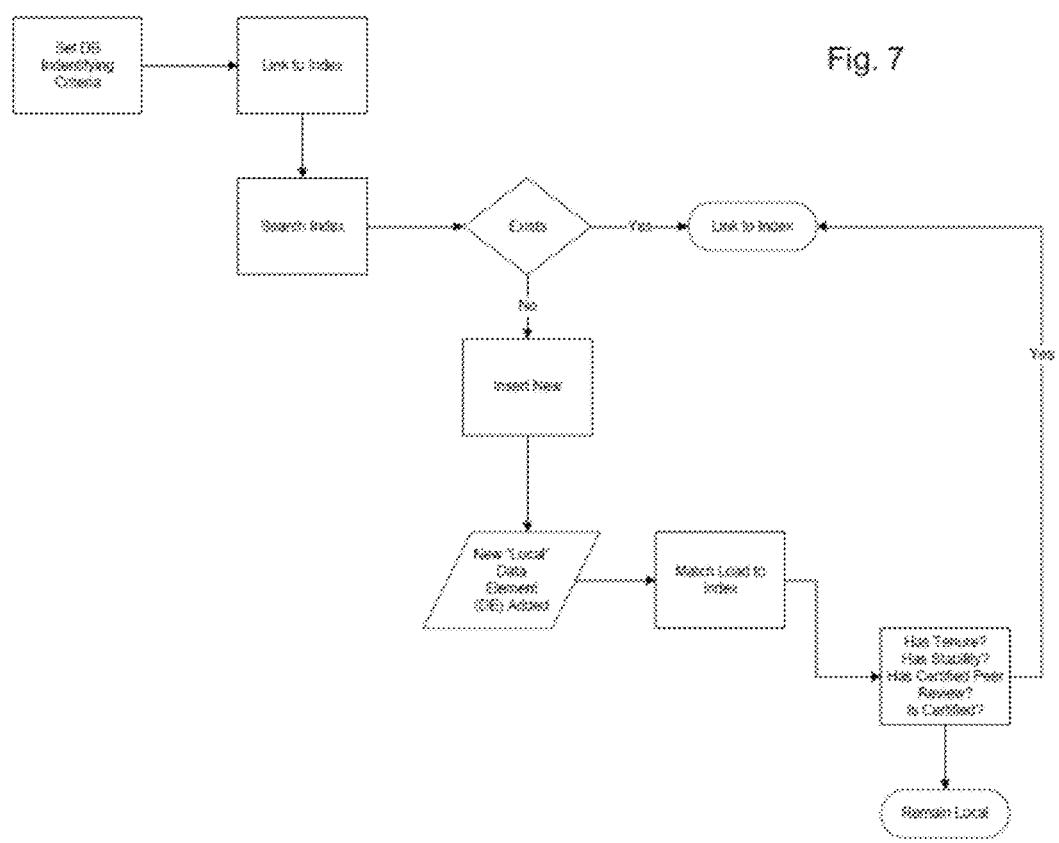
FIG. 7 is a flow chart demonstrating an example of how the universal index server extends the lexicon of universal variables upon demand by adding additional variables responsive to inputs received over the network

FIG. 7 shows a flowcharted process by which the universal index server 30 is configured to extend the lexicon 33 upon demand by adding additional variables responsive to inputs received over the network. As seen also in FIG. 5, additional variables can include more general categorizations of variables, i.e., variables that are broader in meaning than variables already in the lexicon, and additional variables also include more specific itemization variables that represent subcategories of variables already appearing in the lexicon, when such more specific granulation is useful to subscribing databases 22 or found to be in use in one or more of them.

Figure 8:
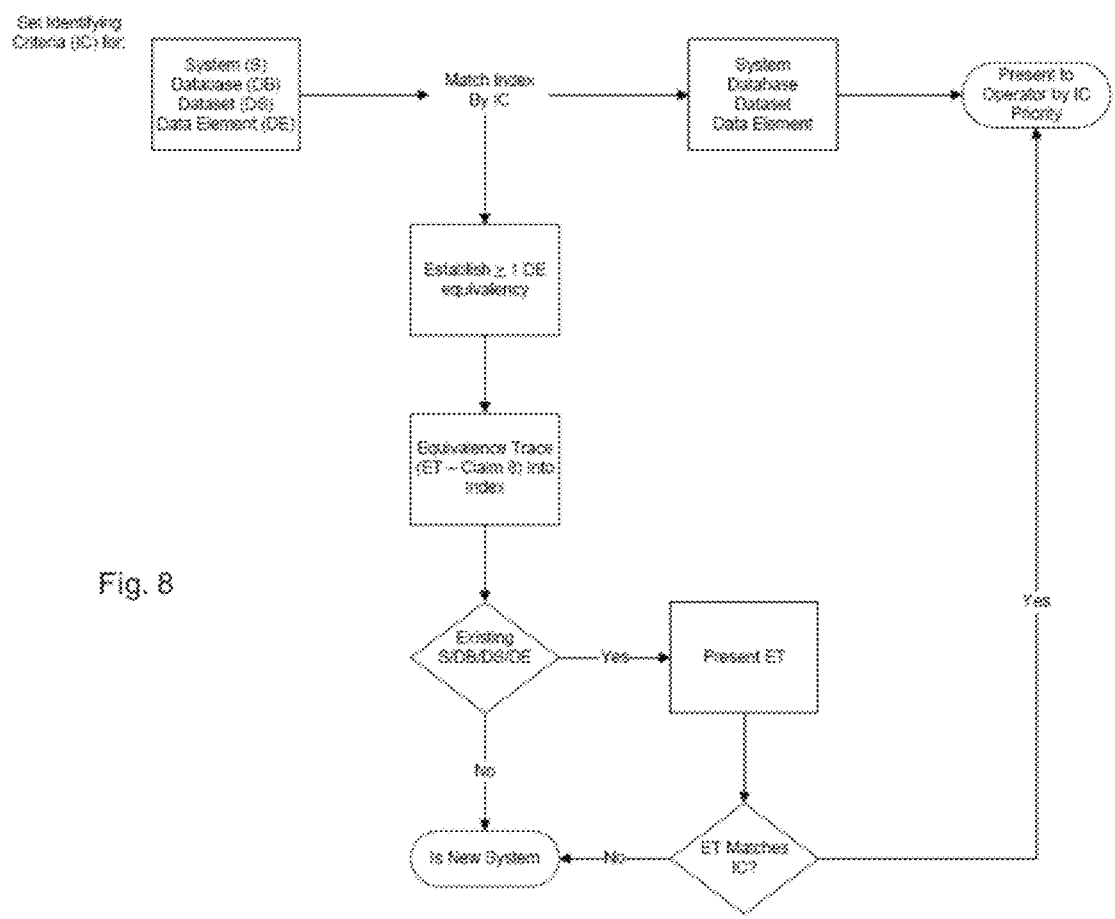
FIG. 8 is a flow chart demonstrating an example of the universal index server upon adding variables as in FIG. 7 to produce or require the insertion or amendment of variable definitions in the universal index, so as to make available information that compares similarities and distinctions among universal index variables.

In the flowchart in FIG. 8, the universal index server 30 is configured upon adding additional variables to produce or require input of corresponding definitions that compare and distinguish the additional variables from the variables already appearing in the lexicon. This aspect can be used to provide a useful hierarchy of broader to narrow variables and meanings, while reducing the tendency to establish or maintain multiple variables with little or no practical difference between their meaning or formatting, etc.

Figure 9:
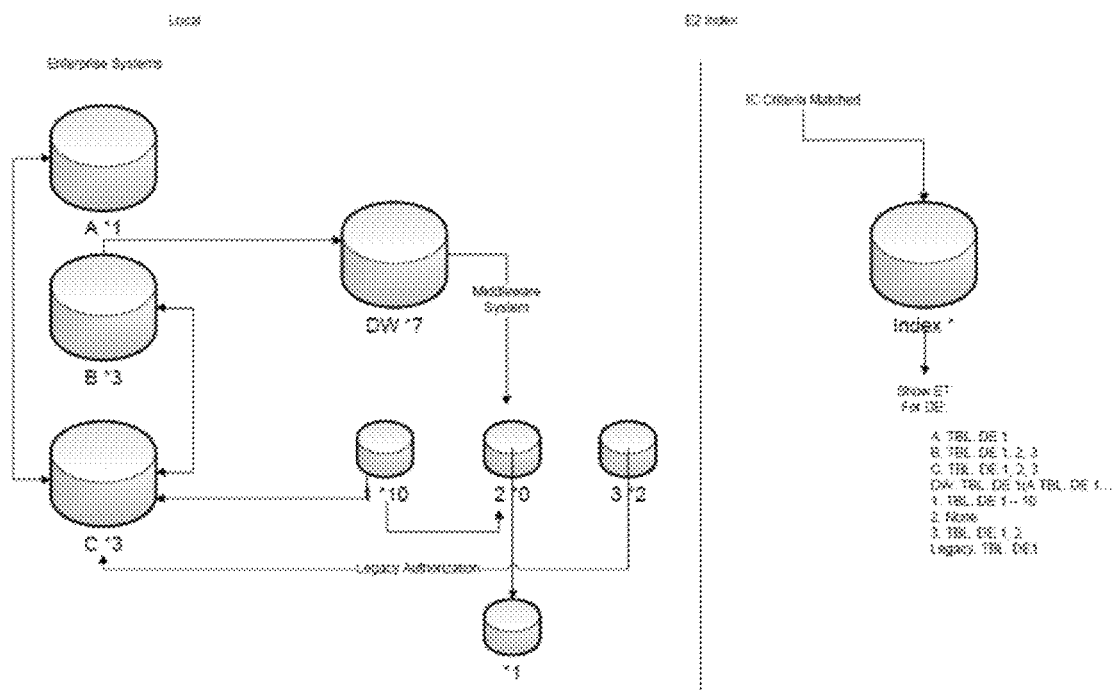
FIG. 9 is a flow chart demonstrating the tracking of variable equivalencies including recording the extent of established equivalence across at least one of a universal index and an integrated system using the universal index.

The extent of any established equivalency is tracked across at least one of a universal index 30 and an integrated system 22 using the universal index 33. The result is the configuration shown in FIG. 9, which is an impact assessment map of one of field-values and database systems, containing a measure of one of direct equivalence and attendant equivalence.

For exploiting the universal index 30, it is possible to employ the universal index as an intermediated server whereby data transmissions are exchanged through established equivalences from local variables, to universal variables deemed equivalent, to the local variables of other systems 22. However, having established equivalences, the system 22 can communicate directly with one another by appending or associating with data transmissions an indication of the equivalence of the variables transmitted, versus universal definitions.

Outputs or data searchable in the universal index for use of subscribing systems 22 and their operators can be made available in multiple formats including but not limited to a table definition, an XML schema, a definition document, etc. The available data and/or outputs of all or part of the data publish the details of the match of an integrated system 22 with the universal index 33 along with any custom details of the fields needed to properly allow the system to dynamically cast data types from one type to another and to properly concatenate values being passed over.

Rules governing the push/pull relationship between multiple systems along with the rules of data hierarchy for overwrite operations are established at the point when the flow of data between two systems is turned on through the universal index. Part of the output will be whether equivalency is confirmed based on either widespread adoption of the particular equivalency or by independent confirmation. Prior to this, localized equivalencies would have a fuzzy relationship where, though the data itself is equivalent, the end-purpose or format of the data may not be, requiring more traditional middleware transformations to work beyond the scope of the local integrated data set.

A custom interpretation of data types exists in the central index server 30 and/or definitions 33 to handle converting integrated data transfers to the highest common denominator match of data types in order to minimize data loss during integrated transfers. Stated data type, field length, encoding languages are examples of items that may be different in similar fields of different databases but used to carry virtually the same information. Consider a FirstName field in an originating database can be a fixed length char type field if it is coming from a legacy system where field lengths were fixed;

FirstName field in the desired integration database could be of type nvarchar with a longer length in order to accommodate names with foreign character values;

In an exemplary embodiment, the universal index server E2 and/or its processes running on the individual databases 22 for establishing variable equivalences versus the lexicon 33 of the universal index is amenable to translations of variable values or formatting that are positively reconcilable. In this case, the process can discern that both fields are FirstName fields (for example by comparison of variable values to a collection of typical values for first names) and allows the field to be paired for integration with a definition.

Under such circumstances, E2 as intermediary, or a direct transmission between qualified databases 22, can comprise data sent freely from one of the first and second systems to the other, without data loss or truncation. But data from the second system is converted into the language set of the first system, then truncated into the space provided. Other steps for translating data are supported such as string or number formats and lengths, languages, etc. Where discrepancies in format are detected, the E2 system or the E2 qualification process running on the local system, preferably alert users for administrator approval before allowing the integration to be implemented, with or without insertion of a translational process to enable the variables to be treated as equivalent through a translation.

In some versions of the disclosed E2 technique, an optional network crawler can be deployed into the E2 platform to search a network (with administrator control) to find databases, read their contents and present them to the central interface for integration with the central index. A crawler, by definition, sniffs port traffic for ODBC calls and traffic. The crawler pulls database definitions from the system table structure to automatically lay the data fields out for matching against the central index. The difference between prior art "crawlers" and the E2 crawler is the reliance on the centralized Index to test-match found data elements. Once an integrated system has been catalogued, E2 equivalencies of "likely matches" can be pushed as test traffic into the system to see what values are accepted within what parameters. By monitoring the SQL trace outputs in this test/match/test/reject approach, the crawler coupled with the already-established E2 index can automatically identify likely matches for operator consideration and approval. An initial attempt to match fields is done automatically by the system by analyzing field names, data types, data held in the fields and other available features. This initial match routine is then presented to an analyst in the integration module for confirmation and/or correction of matches and for matching fields which could not be matched.

In one embodiment, a Network Crawler is provided to run on a network to discover databases for integration. The crawler can use port sniffing to identify database traffic on a network. An administrator can direct the bot to specific ports if desired or the bot can be allowed free range to analyze the entire network. This procedure is useful for consultants who are coming into a client network location as it will allow them to identify systems that may be rogue in an enterprise but that have information that management would like to identify and pull into higher systems for better knowledge management.

Data use by two integrated systems 22 is impliedly similar through the goal of integrating two systems. However the availability of variable data through the universal index improves that extent to which widespread systems are rendered capable of exploiting data. Although the universal server and index E2 system requires attention to establish equivalences, which is a form of management and system overhead and complexity, there is a benefit in the sharing of data in both directions among subscribing systems. That benefit may not apply to every field in every database. A human operator overseeing an integration process can be involved along with whoever else participates in the integration to ensure that they are integrating data that serves a useful business purpose justifying the investment of time or attention needed to extend the date from one system to another by establishing equivalences, possibly introducing a new defined variable and so forth. This consideration also applies to a situation, for example, where a translation may be required, e.g., for handling rules for formatting of street addresses. The central index which may cast data types on the fly during transmission has the ability to accept complex rules to cast from numeric to string, to concatenate lengths as necessary and to perform a wide range of other transformations to massage the data for the subscribing system.

In certain embodiments of enterprise systems, system tables hold the structure and elements of all incorporated databases. In order to lower the technical proficiency needed to run the E2 integration process, an automated process can handle running through the system tables and pulling the fields, content, data types, lengths and other useful information that an analyst would need to properly supervise the integration process. MS SQL Server, Oracle, MySQL, SQLite and other commercially available databases can be cataloged for their storage mechanisms for the bot to recognize and parse. This step is useful for providing preliminary already-collected information, enabling obvious matches to be made and translation processes to be specified with relative ease or even automatically.

E2 integrations as described create opportunities across a full spectrum of business opportunities through the possible system combinations. Some examples are provided in Table III.

TABLE III

| Category | Description |
|---|---|
| e-Commerce Systems | Technology Outreach where the system can become a platform for integration. |
| e-Commerce Integration | Backend → Website Legacy System → Website |
| Same Platform Integration | App → App. Either new or legacy systems. The apps are on the same platform but disconnected. |
| Cross Platform Integration | App → App. Either new or legacy systems. The apps are on entirely different platforms, like a web based Java app and a mainframe UNIX app. |
| Same Business Integration | MyBiz → My Biz. Either new or legacy systems. Two different businesses owned by one entity coming together. |
| Cross Business Integration | My Biz → Your Biz. Either new or legacy systems. Two businesses coming together in a partnership or joint venture. |
| Ongoing Integration Development | Add/Subtract Apps from an integrated system. Either new or legacy systems. |
| Same Application | Where similar applications are separated by geography, i.e. an inventory system used in different warehouses. Either new or legacy systems. |
| App Morphing | App1 + App2 = New App. Either new or legacy systems. |

An example is provided to detail an example of information that may be included to define a variable field in the central index 33, the exemplary field being gender:

field(Gender)

This definition is for the field(Gender) and its associated descriptions. This field designates the sex of an individual. Gender is not used to define sexual orientation, or sexual preferences. This data is for conveying basic concepts about the structure used for specifying all of the currently-conceived definitions for the Gender within E2. Gender can be used for identifying virtually any type of Gender (emanating from a "mixed bag" of genetic elements). The elements or segments that may be the components of establishing Gender will vary depending on genetic factors. The following is an incomplete set of examples of abbreviations for names of potentially-relevant segments (the various components germane to establishing the Biological-gender) for consideration in specifying the current Gender of any animal or person in the world:

1. G=Genotype
2. P=Phenotype
3. A=
4. . . .

Mammals, other vertebrates, and even plants may present with Gender and that biological/medical researchers and veterinarians perform research or tests where Gender may be important. Therefore, Indicators 3-9 are vital for delineation of the complete zoological taxonomy of the organism (e.g., human, Ayes, plant) for specificity that may be important to the details about Gender. Note, however, that only the 9th Indicator need be present. It could even be assumed (if not explicitly stated) as the default for typical human healthcare delivery applications. However, in a veterinary setting that assumption as a default would not be appropriate, and probably not even Class: "Mammalia" could be assumed in such a diverse and unpredictable setting.

| Field: Gender | | |
|---|---|---|
| Indicators | | |
| 0 | Composite Current, Auto-Replicate . . . | |
| 1 | Repeating | 1 |
| 2 | Language (ISO 639.2) | [List is Maintained by LoC] http://www.loc.gov/standards/iso639-2/langcodes.html#cd http://www.loc.gov/standards/ |
| 3 | Kingdom | Animal |
| 4 | Phylum | Chordata |
| 5 | Class | Mammalia |
| 6 | Order | Primates |
| 7 | Family | Hominidae |
| 8 | Genus | *Homo* |
| 9 | Species | *sapiens* |
| Definitions | | | |
|---|---|---|---|
| CODE | SHORT | LONG/DESCRIPTION | EXAMPLE |
| A | SEX | Gender Name String, as it exists | M-F |
| B | B-SEX | Biological-gender | Male |
| C | C-SEX | Preferred and Current Gender | Female |
| D | C-ABR | Abbreviation of C-SEX | F |
| E | SNAM | Official Name of Gender Situation | |
| Indicators: | | | |
| | 1 | Repeating SFC | 1 |
| | 2 | Sequence | Seq. of Off. Name |
| | 3 | SNAM Value | Transgendered |
| | 4 | Former Name | Transsexual |
| F | GGF | General Format of Details of Gender | AAAA |
| G | DGEN | Details of the Gender | XXXY |
| H | TS | Total # of Segments of Gender No. | 4 |
| I | S# | Segment # | |
| Indicators: | | | |
| | 1 | Repeating SFC | 1 |
| | 2 | Sequence | Seq. # this segment |
| | 3 | S# Value | 1 or 2 or 3 or 4 |
| J | SI# | Identity of Segment # | |
| Indicators: | | | |
| | 1 | Repeating SFC | 1 |
| | 2 | Sequence | Seq. # this segment |
| | 3 | SI# Value | G = Genotype |
| K | SL# | Length of Segment # | |

-continued

| | | Field: Gender | |
|---|---|---|---|
| | Indicators: | | |
| | 1 | Repeating SFC | 1 |
| | 2 | Sequence | Seq. # this segment |
| | 3 | SL# Value | 2 |
| L | SV# | Value of Segment # | |
| | Indicators: | | |
| | 1 | Repeating SFC | 1 |
| | 2 | Sequence | Seq. # this segment |
| | 3 | SV# Value | XX is the Genotype |
| M | SD# | Segment Delimiter after Segment # | |
| | Indicators: | | |
| | 1 | Repeating SFC | 1 |
| | 2 | Sequence | Seq. # this segment |
| | 3 | SD# Value | <none> |
| Z | GDSP | Display/Gender "value" of "C" or C-SEX | Female |

In this example of a gender descriptor system, the above-described system may serve as a more-detailed equivalency for TYPES OF GENDERS as well as IDENTIFIERS OF GENDER. Returning to the Amazon.com example, the operator of a new product catalog would find equivalency if, for example, they had gender-specific products for sale (i.e. pink skirts for girls and blue shorts for boys). Having already established the FINANCE<->Amazon<->NEWPRODUCT-CATALOG . . . as the operator's system identifies GENDER as a type and Amazon does not, the operator would add it as a new field. In adding the new field, they would find all the Types and Identifiers of GENDER illustrated in the above example. Because the operator is only interested in Male/Female descriptors, they set their new field as Boy<->MALE IDENTIFIER<->NEWPRODUCTCATALOG<->Amazon<->FINANCE. Of the multiple gender types illustrated, only 2 equivalencies are established in this product catalog example. The subject matter being disclosed and demonstrated with examples, additional embodiments should be apparent to persons of ordinary skill. The invention is not limited to the embodiments disclosed as examples and is capable of embodiment in additional ways that shall be deemed encompassed herein. Therefore, reference should be made to the appended claims rather than the foregoing discussion of preferred embodiments, in order to assess the scope of the invention in which exclusive rights are claimed.

What is claimed is:

1. A system to facilitate information sharing between databases, comprising:
   a plurality of independently functioning database systems each including at least one data processing apparatus with an associated digital memory and being coupled remotely to a data communication network, each of the database systems maintaining data fields that store values of variables having locally predetermined meanings, formatting attributes and relationships according to a database schema that is specific the respective said database system, and wherein the meanings and formatting attributes of the variable and the data fields, and labels applied thereto, differ arbitrarily among the plurality of database systems;
   wherein at least certain variables and data fields in at least two of the database systems maintain values of variables that have substantially equal conceptual meanings;
   a universal index server including at least one data processing apparatus with an associated digital memory, the universal index server being coupled remotely to the at least two database systems over the data communication network, wherein the universal index server is configured to maintain a lexicon of entries for diverse variables, definitions that contain meanings and formatting attributes of the variables being associated with the entries in the lexicon, and documented by information made universally available to at least a subset of the plurality of independently functioning database systems;
   wherein at least one of said universal index server and said at least two database systems supports a comparison process for comparing the locally predetermined meanings and formatting attributes of the variables of the at least two database systems, against the meanings and formatting attributes stored in the universal server,
   wherein the programmed comparison process produces for each of the database systems a cross-reference by which certain said variables of the at least two database systems are referenced separately for each of the at least two database systems, against entries in the lexicon maintained in the universal index server;
   wherein variables with locally predetermined meanings in the at least two database systems are referenced against corresponding definitions in the lexicon, and including translation parameters where required for converting between the locally determined formatting attributes and the formatting attributes for corresponding variables in the lexicon;
   wherein the at least two database systems are configured for at least one of transmitting and receiving variable values that are referenced to said entries in the lexicon with respect to said meanings and formatted to comply with the formatting attributes stored in the universal server;
   wherein the universal index server is configured to extend the lexicon upon demand by adding additional variables responsive to inputs received over the network, and wherein the additional variables comprise at least one of more general categorization variables encompassing variables that are broader in meaning than variables already in the lexicon, and more specific itemization variables that represent subcategories of variables already appearing in the lexicon.

2. The system of claim 1, wherein the programmed comparison process is configured to compare at least one of variable values and variable formatting attributes for producing a tentative version of the cross-reference table.

3. The system of claim 1, wherein the programmed comparison process is configured to compare at least one of variable values and variable formatting attributes for data fields in the at least two databases against standards for commonly encountered variables, for producing a version of the cross-reference table limited to particular ones of the data fields.

4. The system of claim 3, further comprising an integration server coupled to the network and to an operator interface, wherein the integration server is configured to present to a human operator a comparison of the definitions and formatting attributes of variables found in the lexicon against at least one of variable values, formatting attributes, variable labels and schema for variables found in the at least two databases, for prompted additions of data fields to the cross-reference table.

5. The system of claim 1, wherein the universal index server is configured upon adding additional variables to produce or require input of corresponding definitions that compare and distinguish the additional variables from the variables already appearing in the lexicon.

6. The system of claim 5, wherein the extent of any established equivalency is tracked across at least one of a universal index and an integrated system using the universal index, to produce a configuration and impact assessment map of one of field-values and database systems, containing a measure of one of direct equivalence and attendant equivalence.

* * * * *